(No Model.)

J. A. SCARBOROUGH & C. BARDWELL.
WHIFFLETREE.

No. 492,560. Patented Feb. 28, 1893.

Witnesses
C. Muzzy
H. Adler

Inventors
J. A. Scarborough
Carroll Bardwell
By Alexander & Davis
Attorneys

UNITED STATES PATENT OFFICE.

JAMES A. SCARBOROUGH AND CARROLL BARDWELL, OF WESSON, MISSISSIPPI.

WHIFFLETREE.

SPECIFICATION forming part of Letters Patent No. 492,560, dated February 28, 1893.

Application filed September 10, 1892. Serial No. 445,509. (No model.)

*To all whom it may concern:*

Be it known that we, JAMES A. SCARBOROUGH and CARROLL BARDWELL, citizens of the United States, residing at Wesson, in the county of Copiah and State of Mississippi, have invented certain new and useful Improvements in Whiffletrees, of which the following is a specification, reference being had therein to the accompanying drawings.

This invention relates to a new and improved whiffletree; and it has for its object to provide an elastic whiffletree of simple construction which will in a great measure relieve the draft animal and the harness of sudden strains in starting the vehicle or plow, as the case may be, and also to break or relieve any sudden shock or strain caused by the vehicle striking an obstruction.

A further object of the invention is to provide means for easily determining the amount of draft on the animal, and the horse power required to do the work, thus providing means whereby it may be readily seen if the horse or draft animal is being overtaxed.

The invention consists in the novel combination and arrangement of parts hereinafter described and particularly pointed out in the claim appended.

Figure 1:
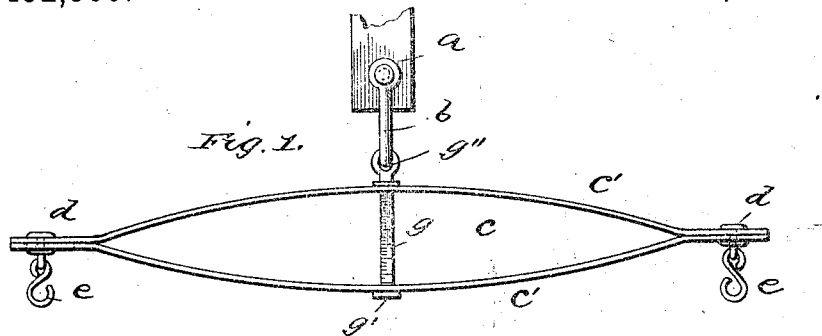
Figure 2:
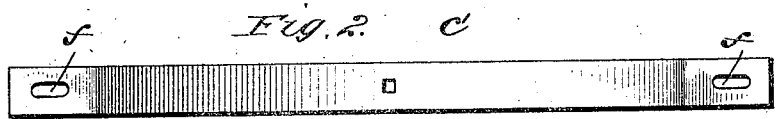
Figure 3:
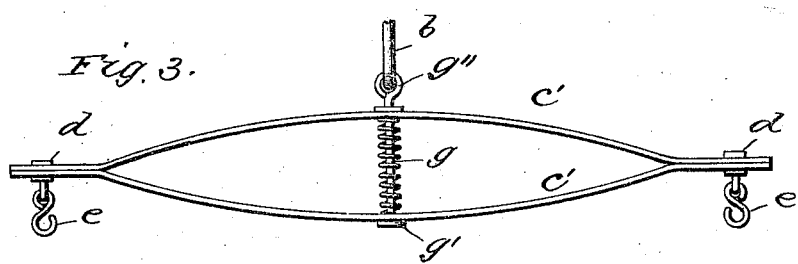
Figure 4:
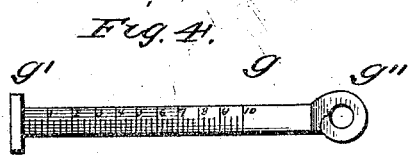

In the drawings:—Figure 1—is a plan view of our improved whiffletree. Fig. 2 is a side elevation of one of its members. Fig. 3 is a plan view showing a modified form; and Fig. 4 is a detail of the scale bar or bolt.

Referring to the various parts by letter, $a$ in the drawings designates the forward end of a plow beam to which is attached by means of the clevis $b$ the whiffletree $c$. This whiffletree consists of two longitudinal members $c'$ $c'$, which are formed of thin strips or leaves of spring-steel of suitable width. These leaves or strips are bowed longitudinally for the greater portion of their length; the ends of each member being straight and adapted to fit closely together as shown. The ends of the strips $c'$ $c'$ are secured together by bolts $d$ which pass forwardly through said strips and have formed at their forward ends eyes in which are secured the trace-hooks $e$ $e$. A slot $f$ is formed in each end of the forward strip $c'$, through which the bolts pass, thereby allowing said strip to partially straighten under a strain.

Passing centrally and rearwardly through the strips $c'$—$c'$ and mid-way between their ends, is a bolt or bar $g$. This bolt is provided at its forward end with a head $g'$ which bears against the front side of the forward strip, and its rear end is formed into an eye $g''$ by means of which it is connected to the clevis $b$. This bar $g$ is provided as shown in Fig. 4, with a scale which indicates as the strips or leaves $c'$ of the whiffletree are drawn together by the draft, the amount of horse power required for the work. And by means of this scale the driver may readily see when the horse or draft animal is being overtaxed.

The operation of our whiffletree will be readily understood from the foregoing when taken in connection with the drawings. The traces are secured to the trace hooks, and the draft operating through them tends to straighten the bowed portion of the whiffletree, the bar $g$ being drawn out rearwardly from between the leaves or members of it, and indicating by the number of divisions of the scale beyond the rear member $c'$ of the whiffletree, how much power is required for the work.

It will be readily understood that these whiffletrees will be tested and the scale marked when they are manufactured.

In Fig. 3, is shown a modified form of our device. In this construction it will be seen that we provide a coil spring which surrounds the bar $g$ between the members of the whiffletree, its ends bearing on the inner sides thereof. By this construction we provide a stronger and stiffer whiffletree without materially adding to its cost or weight.

It will be seen that we provide a device of simple construction which will relieve the horse and harness of sudden strains and shocks, and by its scale attachment indicate to the driver if his horse is being over taxed.

Having thus fully described our invention, what we claim is—

A whiffletree consisting of two longitudinal elastic members, one of said members being slotted at its ends and secured directly to the ends of the other member so as to have a limited longitudinal movement, said members being sprung away and free from each other from said end fastenings throughout the remainder of their length, a bolt secured to the forward member in the middle thereof and passing rearwardly through the rear member and adapted to be secured at its rear end to a vehicle, and trace-hooks secured to the ends of the whiffletree, substantially as described.

In testimony whereof we affix our signatures in presence of two witnesses.

J. A. SCARBOROUGH.
CARROLL BARDWELL.

Witnesses:
H. J. BEASLEY,
F. C. COLLINS.